No. 751,216. Patented February 2, 1904.

UNITED STATES PATENT OFFICE.

KARL STEPHAN AND FRIEDRICH KAISER, OF BERLIN, GERMANY, ASSIGNORS TO CHEMISCHE FABRIK AUF ACTIEN, (VORM. E. SCHERING,) OF BERLIN, GERMANY.

ACIDYL DERIVATIVES OF RUFIGALLIC-ACID ETHERS AND PROCESS OF MAKING SAME.

SPECIFICATION forming part of Letters Patent No. 751,216, dated February 2, 1904.

Application filed November 9, 1903. Serial No. 180,368. (No specimens.)

*To all whom it may concern:*

Be it known that we, KARL STEPHAN and FRIEDRICH KAISER, chemists, doctors of philosophy, residing at Berlin, Germany, have invented a new and useful Improvement in Acidyl Derivatives of Rufigallic-Acid Alkyl Ethers and Processes of Producing the Same, of which the following is a specification.

We have found that the acidyl derivatives of rufigallic-acid alkyl ethers exercise good purgative effects, and have at the same time the property of not coloring the feces and the urine, thus differing from, for example, anthrapurpurin diacetate, (purgatin.) These new compounds are prepared by causing an acidyl reagent to react upon the rufigallic-acid alkyl ethers and then separating the product of reaction. The said new compounds are insoluble in water, very difficultly soluble in alcohol and ether, are tasteless, and have a yellow or brownish color. The acetyl derivatives of rufigallic-acid alkyl ethers have been found especially suitable.

Example: Manufacture of acetyl rufigallic-acid tetramethyl ether. Five kilograms of rufigallic-acid tetramethyl ether (made in accordance with the method of Klobukowsky, see *Berichte der Deutschen Chemischen Gesellschaft*, Vol. X, page 880, or by means of potassium methylsulfate) are boiled with twenty kilograms of anhydrous acetic acid and 1.25 kilograms of melted sodium acetate for three-quarters of an hour with a reflex condenser. After cooling to from 60° to 80° centigrade the mass is poured into eighteen kilograms of water and left standing for from one to two days. Diacetyl rufigallic-acid tetramethyl ether separates from the acetic-acid solution in a solid form, which is recrystallized out of alcohol or benzol or strong acetic acid. The new body is of yellow color and melts at about 180° to 190° centigrade. In an analogous manner the acetyl derivatives of rufigallic-acid ethyl ether can be prepared. The diacetylrufigallic-acid tetraethyl ether separates out from the acetic-acid solution as a yellow crystalline substance, melting at from 230° to 235° centigrade. It can be recrystallized out of chloroform and alcohol. In an analogous manner other acidyl derivatives of rufigallic-acid alkyl ethers may be obtained. Monobenzoylrufigallic-acid tetramethyl ether may, for example, be prepared as follows: One kilogram of rufigallic-acid tetramethyl ether is dissolved in twenty-three kilograms of a ten-per-cent. soda-lye. 0.8 kilogram of benzoyl-chlorid is then added in small doses to the well-shaken mixture until the product of reaction separates out as a sandy powder. The latter is washed in dilute alkali and water, and if then slimy mixed with alcohol, it then precipitating as a light brown powder. It is very easily soluble in chloroform, fairly easily in benzol, and difficultly soluble in either and alcohol. To completely purify it, it is dissolved in chloroform and precipitated with alcohol. Its melting-point is about from 190° to 205° centigrade.

We claim as our invention—

1. As new chemical products the acidyl derivatives of rufigallic-acid alkyl ethers, being insoluble in water, difficultly soluble in alcohol and ether, tasteless, having a yellow or brownish color and exercising purgative effects.

2. The process of obtaining purgatives, which consists in causing an acidyl reagent to react upon rufigallic-acid alkyl ethers and isolating the product of reaction, substantially as described.

In testimony whereof we have signed our names to this specification in the presence of two subscribing witnesses.

KARL STEPHAN.
FRIEDRICH KAISER.

Witnesses:
HENRY HASPER,
WOLDEMAR HAUPT.